United States Patent Office 3,819,594
Patented June 25, 1974

3,819,594
TETRAFLUOROETHYLENE FINE POWDER RESIN OF A COPOLYMER OF TETRAFLUOROETHYLENE AND PERFLUORO (ALKYL VINYL ETHER)
David Alan Holmes, Vienna, W. Va., and Edgar William Fasig, Jr., Wilmington, Del., assignors to E. I. du Pont de Nemours and Company, Wilmington, Del.
No Drawing. Filed May 17, 1972, Ser. No. 254,014
Int. Cl. C08f 15/02
U.S. Cl. 260—87.5 A
9 Claims

ABSTRACT OF THE DISCLOSURE

Tetrafluoroethylene fine powder resin of a copolymer of tetrafluoroethylene with perfluoro (alkyl vinyl ether) is provided having improved flex life resulting from having a specific melt viscosity of from $1 \times 10^9$ to $4.0 \times 10^{10}$ poises at 380° C. and a standard specific gravity of from 2.135 to 2.175. The resin is made by the aqueous dispersion polymerization process; a persulfate initiator is used.

This invention relates to tetrafluoroethylene fine powder resin of a copolymer of tetrafluoroethylene with certain perfluoro (alkyl vinyl ethers), which resin has improved properties, especially flex life.

Two types of polytetrafluoroethylene are available, viz., granular resin and fine powder. Granular resin is made by polymerizing tetrafluoroethylene in an aqueous medium under conditions which cause the polymer to coagulate during the polymerization reaction to form particles which generally exceed 500 microns in diameter. The resin is then comminuted to smaller particle sizes, e.g., 30 to 100 microns for molding purposes by such techniques as preforming and sintering or ram extrusion of a sintered article.

The fine powder type of resin is made by polymerizing tetrafluoroethylene in an aqueous medium under conditions which maintain the polymer dispersed as fine particles 0.05 to 1.0 micron in diameter in the medium until the polymerization reaction is completed. The resultant aqueous dispersion can then be coagulated and dried and is useful in this form for paste extrusion.

Two main differences between the processes for making these resins is that (a) stirring in the granular polymerization system is more vigorous than in the fine powder polymerization system to cause coagulation during the polymeriaztion reaction and (b) sufficient dispersing agent is present in the fine powder polymerization system to maintain the polymer particles dispersed until the polymerization reaction is completed, whereas the amount, if any, of dispersing agent present in the granular polymerization system is insufficient to give this result.

The commercially available fine powder type of resin is not fabricable by the commercial preforming and ram extrusion processes used for granular resin, and the granular resin is not fabricable by paste extrusion, by which fine powder is most commonly processed.

The present invention arises in the field of the fine powder type of resin. In this field, U.S. Pat. No. 3,142,665 to Cardinal (et al.) discloses tetrafluoroethylene resins having improved paste extrudability when the tetrafluoroethylene is polymerized in the presence of certain modifiers selected from the group consisting of 1. non-polymerizable chain transfer agents containing at least one covalently-bound non-metallic atom other than fluorine,
2. perfluoroalkyl trifluoroethylene of 3 to 10 carbon atoms, and
3. oxyperfluoroalkyl trifluoroethylenes of 3 to 10 carbon atoms.

The use of modifiers (2) or (3) is said to provide resins having outstanding flexural properties, with the lower carbon modifiers (2) or (3) being preferred for optimum heat aging and paste extrudability properties, with hexafluoropropylene of modifier group (2) being preferred for optimum sintering properties. Although these resins are copolymers, they are usually referred to as modified polytetrafluoroethylene because they act like the homopolymer in the sense of exhibiting no significant melt flow and having the chemical properties of the homopolymer.

THE PRESENT INVENTION

The present invention involves the discovery that certain copolymers of tetrafluoroethylene with certain modifiers of Cardinal's group (3) provide fine powder resins which have properties which are superior to fine powders made or taught heretofore. More specifically, the present invention comprises a tetrafluoroethylene fine powder resin consisting essentially of a copolymer of tetrafluoroethylene with perfluoro (alkyl vinyl ether) in which the alkyl group contains from 1 to 5 carbon atoms, the resin having a specific melt viscosity of no greater than $4.0 \times 10^{10}$ poises at 380° C. and a standard specific gravity (SSG) of no greater than 2.175. In addition to these parameters, the fine powder resins of the present invention can be characterized in terms of the copolymer being in the form of substantially spheroidal particles 0.01 to 1.0 micron in diameter having an average particle diameter in the range of 0.07 to 0.35 micron.

The resin also has a specific melt viscosity of greater than $1 \times 10^9$ poises at 380° C. The significance of this minimum specific melt viscosity is that the viscosity of the resins is too high for fabrication from the molten state, i.e., the resin of the present invention as is the case with all high molecular weight tetrafluoroethylene fine powder resins has essentially no melt flow and therefore is not melt-fabricable.

Cardinal discloses resins with minimum specific melt viscosity of $1 \times 10^9$ poises at 380° C. and a specific gravity of less than 2.235. The resins of the present invention fall within those ranges, but have relatively low melt viscosity and particularly low specific gravity within those ranges. This gives unexpected advantages, as will be described hereinafter.

Examples 27 and 28 of Cardinal discloses the polymerization of tetrafluoroethylene in the presence of varying small amounts of perfluoro(propyl vinyl ether) to form resins having standard specific gravities (SSG) of 2.223 and 2.184, respectively. The specific melt viscosities of these copolymers are $6.2 \times 10^{10}$ poises and $4.8 \times 10^{10}$ poises, both at 380° C., for Examples 27 and 28, respectively.

In Example 28 of Cardinal the perfluoro(propyl vinyl ether) concentration in the copolymer is 0.114 wt. percent. The presence of a similar amount of this monomer in copolymers of the present invention distinguishes from Cardinal by providing a fine powder resin of different structure characterized by being lower in density and lower in molecular weight than Cardinal, as indicated by the lower standard specific gravity and specific melt viscosity values, respectively, generally characterizing all the copolymer fine powder resins of the present invention.

The fact that copolymer fine powder resin can be made from the same comonomer used in the Cardinal Examples 27 and 28, but having both lower density and lower melt viscosity while still retaining the non-melt fabricability of polytetrafluoroethylene, is unexpected. Normally, as melt viscosity (molecular weight) decreases, density (SSG) increases.

Further unexpected is the fact that lower melt viscosity (lower molecular weight) fine powder resins of the present invention have better mechanical properties than their higher molecular weight counterparts.

In the context of the present invention and that of Cardinal, wherein only small ranges of comonomer contents are involved, changes in comonomer content within these ranges have little effect on standard specific gravity. To illustrate, the Cardinal Examples 13–15 show the effect of increasing hexafluoropropylene concentration by 300 and 500% to produce a change of only 0.006 in SSG values with no distinct trend. Similarly, a nine-fold increase in hexafluoropropylene concentration between Cardinal Examples 21 and 22 produces a change of only 0.007 SSG units, with the copolymer containing the greater amount of hexafluoropropylene exhibiting the higher SSG value. The small amount of comonomer present in the Cardinal Example 28 as compared to Example 27 has an initial sharp effect on SSG, but a rather small effect on specific melt viscosity, i.e., the more than 1000% increase in comonomer content from Example 27 to 28 causes a reduction of only 28% in specific melt viscosity.

Another effect shown in Cardinal arising out of the use of perfluoro(propyl vinyl ether) and out of increasing the comonomer content from Example 27 to 28 is the large reduction in polymerization rates to the low value of 179 and 135 g./liter-hr., respectively, as compared to the rate normally obtained of greater than 350 g./liter-hr.

Thus, it is neither foreseeable nor indicated to be desirable from the Cardinal disclosure that one could or should obtain the copolymer fine powder resins of the present invention.

The perfluoro(alkyl vinyl ethers) monomers used in the present invention are known compounds, described in U.S. Pat. 3,180,895 to Harris et al. and as copolymers with tetrafluoroethylene in U.S. Pat. 3,132,123 to Harris et al. The ether should be of high purity, e.g., at least 95 weight percent pure, and the impurities present, if any, should not have any appreciable effect on the polymerization rate in the copolymerization reaction with tetrafluoroethylene. The removal of undesirable secondary and tertiary isomers is disclosed in U.S. Pat. Application 44,111, filed June 8, 1970, by Resnick (published Dec. 10, 1971, as Dutch Application 07837/71).

The procedure of preparing the copolymers of the present invention is similar to Cardinal and earlier fine powder polymerization systems, wherein an aqueous medium is formed containing dissolved polymerization initiator and dispersing agent, as well as paraffin wax anti-coagulant. The medium is charged to an evacuated, clean reactor and is then heated to the polymerization temperatures desired, which melts the wax, accompanied by stirring of the medium. After this heatup the reactor is pressured with tetrafluoroethylene until a dispersion of the desired fine powder resin solids is obtained.

As in Examples 27 and 28 of Cardinal, the perfluoro (alkyl vinyl ether) comonomer can be added to the aqueous medium so as to be present at the start of the polymerization run. The amount of comonomer added will depend on the proportion of units derived from the comonomer desired in the resultant copolymer, on the particular comonomer used, and on the polymerization conditions used. If the comonomer is added at the beginning of the polymerization run, then the amount so added should be sufficient to provide some presence of unreacted comonomer throughout the remainder of the run. The vinyl ether monomer content of the resultant copolymer should generally be from 0.03 to 1.0 percent based on the weight of the copolymer, with the optimum amount depending on the particular vinyl ether monomer used. The perfluoroalkyl group is normal, i.e., straight-chained. Thus, the ether comonomers of the present invention are as follows:

perfluoro(methyl vinyl ether),
perfluoro(ethyl vinyl ether),
perfluoro(propyl vinyl ether),
perfluoro(butyl vinyl ether), and
perfluoro(pentyl vinyl ether).

Preferably, the alkyl group of the ether comonomers contains from 1 to 4 carbon atoms. The preferred vinyl ether comonomer content in the copolymer is from 0.03 to 0.5 weight percent.

It is critical in the present invention that the initiator used not be the disuccinic acid peroxide initiator used in Cardinal Examples 27 and 28, because, for some unknown reason, resins having the standard specific gravity and specific-melt viscosity characteristics of the resins of the present invention cannot be obtained. Thus, the initiator used for operability as well as for purposes of economy should be a persulfate initiator, viz., ammonium persulfate or an alkali metal persulfate, with ammonium persulfate being preferred. The persulfate initiator affects the polymerization reaction in such a way as to lead to the relatively low density and low molecular weight for the resins of the present invention. The temperature of polymerization and initiator concentration are chosen to give the molecular weight and reaction rate desired. Typical polymerization temperatures are 65 to 80° C. The concentration of initiator used is generally less than used in Cardinal, e.g., from 0.0005 to 0.002 weight percent based on the aqueous medium charge to the polymerization reactor.

In contrast to the inordinate slowdown effect the disuccinic acid peroxide (DSP) initiator has on the polymerization rates reported in Examples 27 and 28 of Cardinal, the persulfate initiator used in the present invention leads to a much faster reaction rate, not appreciably below the reaction rate for homopolymerization of tetrafluoroethylene. The use of a greater concentration of DSP increases the reaction rate and decreases the specific-melt viscosity, but at the same time increases the standard specific gravity. Thus, a three-fold increase in DSP concentration and 5° C. increase in temperature to give a space time yield of 359 g./l./hr. yields a resin having a specific melt viscosity of $1.0 \times 10^{10}$ poises at 380° C., a standard specific gravity increased to 2.23 and a perfluoro(propyl vinyl ether) content of 0.092 weight percent.

The perfluoro(alkyl vinyl ether) concentration in the copolymer of the present invention, although small in amount, is believed to be primarily responsible for the low density (low standard specific gravity) of the resin while the initiator and polymerization conditions would have a lesser though significant effect. Initiator and polymerization conditions cannot be used alone to arrive at tetrafluoroethylene homopolymer having the density and viscosity characteristics of the copolymers of the present invention.

By way of illustration, the granular type of homopolymer is considered to be the highest molecular weight polytetrafluoroethylene. For a standard specific gravity of 2.175 and below, the range of the present invention, granular polytetrafluoroethylene (homopolymer) resins have melt viscosities at 380° C. of about $8 \times 10^{10}$ poises and higher. Because of these high viscosities, it is commonly found that, unless the granular resin to be preformed into the SSG chip is in an extremely finely divided condition, void spaces are left between the particles in the SSG chip after it has been sintered. This causes the measured SSG, as determined by water displacement using the entire chip, to be "artificially" reduced below the value corresponding to the standard specific gravity of the polymer itself. On the other hand, the SSG procedure practiced on fine powder resins such as those of the present invention and of Cardinal gives the actual SSG of the resin itself, because the chips of the resin obtained using the procedure are void free.

Another variation from the Cardinal process that is desired in the present invention is the programmed addition of the dispersing agent to the aqueous medium during polymerization. This programmed addition involves establishing a dispersing agent concentration in the aqueous medium according to the following program: Concentration of at least 0.0001 weight percent dispersing agent before 2 weight percent of polymer solids are formed, an average of 0.0002 to 0.05 weight percent dispersing agent during the period of formation of from 0 to 4 weight percent polymer solids, and in excess of 0.05 weight percent dispersing agent during the period in which the polymer solids exceeds 10 weight percent. The foregoing percents describing dispersing agent concentration are based on the weight of the aqueous medium charge and the percents describing polymer solids are based on the total weight of the dispersion including polymer solids. Preferably, the polymerization is carried to a polymer solids content of at least 20 weight percent before termination of the run. Further detail on the technique of programming the addition of dispersing agent and the variety of dispersing agents that can be used to make the fine powder resin of the present invention is disclosed in U.S. Pat. No. 3,391,099 to Punderson.

The effect of programmed addition of dispersing agent is to increase the average particle diameter of the resin particles in the dispersion to lead to an acceptable extrusion pressure in subsequent paste extrusion of the fine powder resin.

The vinyl ether comonomer can be added to the polymerization reactor before polymerization is begun. Such comonomer, e.g. perfluoro(propyl vinyl ether) is a known nucleating agent (U.S. Pat. 3,245,972 to Anderson et al.) which has the effect of reducing average particle diameter. Unexpectedly, the increase in average particle diameter obtained by programmed addition of dispersing agent as described above is not nullified by addition of the vinyl ether comonomer before beginning polymerization.

The extrusion performance of resins of the present invention refer to paste extrusion according to the following test: The fine powder resin obtained by coagulation of the dispersion by mechanical agitation is dried in an air oven for at least 16 hours at a temperature of 150° C. Two hundred grams of the dry resin are placed in a cylindrical glass jar about 9.24 cm. in diameter and blended with 47.6 grams of "Varsol," a commercially available kerosene type hydrocarbon lubricant having a boiling point of 160° C. and a viscosity of 0.92 poises at 25° C. The jar and contents are rolled for 20 minutes at 30 r.p.m. to effect blending, and then placed in a water bath maintained at 30° C. for 2 hours for conditioning. The lubricated resin is then pressed at about 3.5 kg./cm.² gauge pressure into a cylindrically shaped preform 2.86 cm. in diameter and about 26 cm. in height. The preform is placed into the vertically disposed cylinder of a paste extruder, the cylinder being of 3.18 cm. diameter. The extruder terminates in a conical surface having an apex angle of 30° and leading to an orifice having a uniform diameter of 0.079 cm. and a land length of 0.038 cm. The reduction ratio of the die is 1600:1. Water from a thermostated bath maintained at 30° C. is circulated around the cylinder and die to hold the extrusion temperature constant. A ram is advanced along the cylinder at a rate which extrudes $19.0\pm1.0$ grams of polymer (lubricant-free basis) per minute. The pressure developed in the ram face in contact with the sample is recorded as a function of time. The average steady-state pressure required to extrude the sample during the entire fourth minute, as measured from the time of first emergence of extrudate from the die, is determined, and this is the extrusion pressure reported herein.

Fine powder resins of the present invention produce continuous extrudate when subjected to this performance test. The general range of extrusion pressure (gauge pressure) for fine powder resins of the present invention in this procedure is from 350 to 750 kg./cm.² and the preferred range is from 400 to 650 kg./cm.². Polymerizations in which all the dispersing agent is added in the beginning of the run tend to produce a fine powder resin of too small an average particle size, e.g., 0.070 to 0.140 micron in diameter, which require high extrusion pressures outside the preferred range, in the above paste extrusion procedure. Such a resin has some utility in paste extrusion under different conditions, e.g., a lower reduction ratio, but extrusion pressures within the preferred range impart a broader range of utility to the fine powder resin. Programmed addition provides a fine powder resin of increased average particle diameter, e.g., 0.150 to 0.220 micron, which requires low extrusion pressures, generally within the preferred range depending on comonomer content.

The fine powder resins of the present invntion have greatly improved flex life over the tetrafluoroethylene/perfluoro (alkyl vinyl ether) fine powder resin prepared according to Cardinal. A similar magnitude of improvement is exhibited over the commercially available tetrafluoroethylene/hexafluoropropylene copolymer fine powder resin. The fine powder resins of the present invention also exhibit improved (lower) flex modulus and thermal stability over the latter commercially available resin. The lower flex modulus makes tubing of the resin more flexible, making it easier to handle and install the tubing in commercial applications. The low specific melt viscosity of the fine powder resins of the present invention gives them improved sinterability over both types of copolymers disclosed in Cardinal.

Flex life is measured according to the following procedure: The test specimen is made by leveling 80 g. of dry resin between pieces of aluminum foil in a cylindrical mold 5.72 cm. inside diameter, and pressure is gradually applied during about 30 seconds to reach a final pressure of 352 kg./cm.² gauge pressure which is held for two minutes. The resulting preform is baked in an air oven at 371° C. for 90 minutes, cooled to 250° C. at a rate of 1° C. per minute, held at 250° C. for 30 minutes, and removed from the oven. The billet is then centered in a lathe and skived to obtain film about 0.254 mm. thick. The film is then cut into sections 1.27 cm. wide and 14 cm. long. These test specimens are then held at 322° C. for an indicated time and the oven is cooled to 290° C. at about 1° C. per minute. After removal from the oven, the test specimen is inserted in a MIT Folding Endurance Tester under a tension of 1.2 kg. This tester is described in ASTM Method D 2176–63T; although the sample size is different, the same procedure is followed. The number of double folds required to break the test specimen is recorded as the flex life. The fine powder resin of the present invention exhibits a flex life of at least $8\times10^6$ cycles preferably even after aging at 322° C. for 30 days.

The standard specific gravities (SSG) disclosed herein for the final powder resins of the present invention are determined by the procedure for determining this parameter disclosed in the Cardinal patent, except that 12 gm., instead of 3.5 gm., chips of the same diameter were used. This variation from the Cardinal procedure gives a slightly higher SSG value than the value obtained using the 3.5 gm. chip of the Cardinal procedure. More specifically, the SSG results using the different chip weights are related to one another by the relationship $$SSG_{12\ g.} = 0.408 + 0.814\ SSG_{3.5\ g.};$$

an SSG of 2.160 determined using a 3.5 gm. chip measures 2.166 using a 12 gm. chip. The preferred SSG range for resins of the present invention is from 2.140 to 2.165.

The specific melt viscosities disclosed herein for the fine powder resins of the present invention are determined by the following procedure: To obtain specific melt viscosity, the rate of elongation is measured for a small strip of resin in creep under a known tensile stress. The same viscosity value is obtained when the extrusion procedure described in U.S. 3,142,665 is followed. The creep method is used because much shorter analysis times are required. In the procedure used to prepare the resin sample, 12 g. of fine powder resin is placed in a 7.6 cm. diameter mold between 0.152 cm. rubber cauls and paper spacers. The mold is then heated at 100° C. for 1 hour. Pressure is then slowly applied on the mold until a value of 140.6 kg./cm.² is obtained. This pressure is held for 5 minutes and then released slowly. After the sample disc is removed from the mold and separated from the cauls and paper spacers, it is sintered at 380° C. for 30 minutes. The oven is then cooled to 290° C. at a rate of about 1° C. a minute and the sample is removed. A crack-free rectangular sliver with the following dimensions is cut: 0.152 to 0.165 cm. wide, 0.152 to 0.165 cm. thick, and at least 6 cm. long. The dimensions are measured accurately and the cross-sectional area is calculated. The sample sliver is attached at each end to quartz rods by wrapping with silver-coated copper wire. The distance between wrappings is 4.0 cm. This quartz rod-sample assembly is placed in a columnar oven where the 4 cm. test length is brought to a temperature of 380±2° C. A weight is then attached to the bottom quartz rod to give a total weight suspended from the sample sliver of about 4 g. The elongation measurements vs. time are obtained, and the best average value for the creep curve in the interval between 30 and 60 minutes is measured. The specific melt viscosity, which may be better called apparent melt viscosity, is then calculated from the relationship $$\eta = \frac{W L_t g}{3 (dL_T/dt) A_T}$$

where $\eta =$ (apparent) melt viscosity in shear, poises
$W =$ tensile load on sample, g.
$L_T =$ length of sample (at 380° C.) cms. (4.32 cm).
$g =$ gravitational constant, 980 cm./sec.²
$(dL_T/dt) =$ rate of elongation of sample under load = slope of elongation vs. time plot, cm./sec.
$A_T =$ cross-sectional area of sample (at 380° C.), cm.²—area increases 37% at 380° C. over that at room temperature The preferred specific melt viscosities are from $1 \times 10^9$ to $3.5 \times 10^{10}$ poises at 380° C.

While the flex life, SSG, and specific melt viscosity characteristics are described herein with reference to the fine powder resin, it should be understood that these characteristics are obtained from the test samples formed from the resin as described in the test procedures.

The average particle diameters referred to herein are determined by the light scattering procedure disclosed in the Punderson patent. The refractive index increment used in 0.020 cc./gm. The average particle diameter and particle diameter range refer to the particles in the aqueous dispersion formed during polymerization. Subsequent coagulation of the particles in the dispersion results in agglomeration of the particles to agglomerate sizes such as 500 microns in diameter. In the subsequent paste extrusion of the resin, however, it is the average particle diameter, particle diameter range and spheroidal shape of the particles in the original aqueous dispersion that is mainly determinative of the paste extrudability characteristics of the resin.

The vinyl ether content of the fine powder resins of the present invention can be determined by material balance, calculating the ether monomer content from the amount fed to the polymerization reactor minus the amount remaining in the reactor after polymerization is complete. An infrared analysis procedure is available for determining the weight percent of perfluoro(propyl vinyl ether) in the copolymer fine powder resin as follows: A 1.75 g. sample of dry fine powder resin is leveled between pieces of aluminum foil in a cylindrical mold, 2.86 cm. inside diameter. A pressure of 703 kg./cm.² is applied for one minute at ambient temperature. The pressed crack-free sample, which is about 0.127 cm. thick, is then analyzed by infrared. The sample is scanned from 9.6 to 11.4 microns. A straight base line is drawn from the absorbance minimum at 9.9 microns to that 11.25 microns. The ratio of (1) the absorbance from the base line to the maximum at 10.1 microns to (2) the absorbance from the base line to the absorbance maximum at 10.7 microns is obtained. The actual weight percent perfluoro(propyl vinyl ether) is determined by the product of the ratio of absorbance and the factor, 0.14. This factor can be used for absorbance ratios up to at least 1.0.

Examples of the present invention are as follows (parts and percents are by weight unless otherwise indicated):

EXAMPLE 1

The following polymerization reaction was conducted: A horizontally disposed, water/steam jacketed, cylindrical stainless-steel autoclave located in a barricade and having a capacity of 36,250 cc. and a length-to-diameter ratio of about 1.5 to 1, and provided with a 4-bladed cage-type agitator capable of being rotated at 46 r.p.m. and running the length of the autoclave, was evacuated, and then charged with 855 grams of paraffin wax, 21.8 kg. of demineralized water, and 2.0 grams of ammonium perfluorocaprylate (C–8 APFC) dispersing agent. The autoclave was then heated to 65° C., after which 0.33 g. ammonium persulfate initiator was added. The charge was heated to 72° C. with stirring and then 20.5 ml. of perfluoropropyl vinyl ether was added, and the autoclave was pressured over a period of about 2 minutes to 26.7 kg./cm.² absolute with tetrafluoroethylene. Stirring rate and temperature were maintained until kickoff occurred as evidenced by a 0.7 kg./cm.² drop in pressure, and the time from the start of the pressure-up to the kickoff was recorded. The temperature was immediately raised to 75° C. where it was maintained throughout the polymerization. Additional tetrafluoroethylene was then added to raise the reaction pressure to 28.1 kg./cm.² and to maintain the reaction pressure constant until a dispersion of approximately 35 percent solids content (total polymer plus aqueous medium basis) was obtained. After about 1000 grams of tetrafluoroethylene had been fed after kickoff (4.4 percent solids formed), 860 ml. of 3.1 percent by weight, aqueous solution of C–8 APFC was injected into the autoclave to stabilize the dispersion. After 10,050 grams of tetrafluoroethylene had been fed after kickoff, the monomer feed to the autoclave was terminated, and the pressure was allowed to decrease to 12.3 kg./cm.² before agitation was stopped and the vapor space of the reactor was vented. The polymerization time from kickoff to time when agitator was turned off was 88 min. The reaction rate (space time yield) was 372 g./l.-hr. The resulting dispersion was discharged and cooled, after which the supernatant solid wax was removed, and the dispersion was diluted, brought to a pH of 8 to 9 by addition of ammonium hydroxide, and coagulated by the procedure of Example 2 of U.S. Pat. 2,593,583 to Lontz, except that the coagulation temperature was 72° F. and the resin was stirred 7 minutes after a jelly-like mass was obtained. The resin was dried for 16 hours at 150° C. This coagulation and drying procedure is generally used for all the resins described in the Examples in order to obtain the resin on which the flex, SSG, and specific melt viscosity test procedures are conducted.

The fine powder resin of this Example exhibited a flex life of $18 \times 10^6$ cycles after aging for 30.8 days at 322° C., had an average particle diameter of 0.188 micron, an SSG of 2.149, and a specific melt viscosity of $0.9 \times 10^{10}$ poises at 380° C. The fine powder resin produced a continuous extrudate in the paste extrusion performance test, requiring a steady state pressure of 534 kg./cm.². Infrared analysis showed the presence of 0.102 weight percent PPVE in the resin.

When the above polymerization procedure was repeated except that all the dispersing agent was added before the polymerization reaction began, the resultant SSG was 2.148, average particle diameter was 0.137 micron, and an excessive extrusion pressure of 770 kg./cm.² was required in the extrusion performance test in which a continuous extrudate was obtained.

COMPARISON EXAMPLES

Fine powder resin made from tetrafluoroethylene and PPVE essentially according to the procedure disclosed for Example 28 of Cardinal had a flex life of only $4 \times 10^6$ cycles after aging at 322° C. for 31.9 days. This fine powder resin had a specific melt viscosity of $4.8 \times 10^{10}$ poises at 380° C. and SSG of 2.182, an average particle diameter of 0.143 micron, a PPVE content of 0.091 weight percent (as compared to an actual 0.114 weight percent for the Example 28 polymer), a polymerization rate of 102 g./l.-hr. and polymerization time of 310 min. to obtain a dispersion polymer solids of 34.5 weight percent. This fine powder formed a continuous extrudate in the extrusion performance test, but required a high extrusion pressure of 759 kg./cm.² gauge pressure. The autoclave used to make this fine powder resin had a length-to-diameter ratio 1.5:1 as compared to 2.6:1 in Example 28; this difference would not be expected to affect the results.

By way of further comparison, the flex life of commercially available fine resin powder which is a copolymer of tetrafluoroethylene with 0.138 weight percent hexafluoropropylene was $4 \times 10^6$ cycles after aging at 322° C. for 11.3 days and only $1 \times 10^6$ cycles after aging at 322° C. for 26.9 days. This resin had an SSG of 2.178, an average particle diameter of 0.170 micron, specific melt viscosity of about $3 \times 10^{10}$ poises at 380° C., and required an extrusion pressure of 534 kg./cm.² in forming a continuous extrudate in the extrusion performance test.

EXAMPLE 2

The polymerization procedure of Example 1 was essentially repeated except that 17 ml. of perfluoro (methyl vinyl ether) (PMVE) was added to the aqueous medium instead of the PPVE. The polymerization rate was 452 g./l.-hr., the polymerization time was 63 min. and the percent polymer solids was 32.2. The resultant fine powder resin had a flex life of over $17 \times 10^6$ cycles (test specimen never broke, test discontinued after this level of flexing was obtained) after aging at 322° C. for 11.3 days, an average particles diameter of 0.204 micron, an SSG of 2.145, and a specific melt viscosity of $1.3 \times 10^{10}$ poises at 380° C. The fine powder resin formed a continuous extrudate when subjected to the extrusion performance test, requiring an extrusion pressure of 541 kg./cm.². The PMVE content of the resin was estimated to be from 0.06 to 0.17 weight percent.

EXAMPLE 3

The polymerization procedure of Example 1 was essentially repeated except that 18 ml. of PPVE was added to the aqueous medium and the water charge was 21.0 kg. The polymerization run was discontinued after 35.1 weight percent polymer solids had formed. The resultant fine powder resin had an SSG of 2.152, a specific melt viscosity of $8 \times 10^9$ poises at 380° C., an average particle diameter of 0.192 micron, and formed a continuous extrudate in the extrusion performance test, requiring a pressure of 495 kg./cm.². Infrared analysis showed the resin contained 0.087 weight percent of PPVE.

EXAMPLE 4

The polymerization procedure of Example 1 was essentially repeated except that 14 ml. of PMVE was added to the aqueous medium instead of PPVE. The polymerization run was discontinued after 28.3 weight percent polymer solids had formed. The resultant fine powder had an SSG of 2.145, an average particle diameter of 0.223 micron, and formed a continuous extrudate in the extrusion performance test, requiring an extrusion pressure of 442 kg./cm.². The PMVE content of the resin was estimated to be from 0.06 to 0.21 weight percent.

In the foregoing Examples, the amount of coagulum plus wax obtained from the polymerization reaction was 908 g. for Example 1 (first paragraph), 953 g. for Example 2 and 790 g. for Example 3 and was about 3600 g. for Example 4. The fine powders of these Examples and the comparison Examples can be characterized by being in the form of substantially spheroidal particles 0.01 to 1.0 micron in diameter.

EXAMPLE 5

A horizontally-disposed, water-steam jacketed, cylindrical stainless steel 6200 ml. capacity autoclave having a cage-type agitator running the length of the autoclave was charged with 3600 ml. of deoxygenated, distilled water, 4.92 g. of ammonium perfluorocaprylate dispersing agent, 0.065 g. of ammonium persulfate, evacuated and purged with tetrafluoroethylene three times, evacuated, and then 10 cm. Hg pressure of gaseous perfluoro(ethyl vinyl ether) (PEVE), corresponding to 3.0 g., was added. The agitator was then turned on to operate at 105 r.p.m. and the autoclave was heated to 75° C. and maintained at this temperature and agitation for the remainder of the run. Upon reaching temperature, the autoclave was pressured to 28 kg./cm.² (gauge) with tetrafluoroethylene. After polymerization began as evidenced by a pressure drop within the autoclave, the TFE pressure was maintained at 28 kg./cm.². After about 55 min. from the beginning of polymerization, the TFE feed was discontinued and the autoclave permitted to react down to a pressure of 12.3 kg./cm.² at which time the polymerization was stopped. The total polymerization time was 64 min. and the space-time yield was 463 g./l.-hr. The percent polymer solids in the resultant dispersion was 33.7% and the PEVE concentration in the copolymer is estimated to be from 0.05 to 0.13 wt. percent. The coagulated and dried resin (substantially as in Example 1) exhibited an SSG of 2.160, specific melt viscosity of $2 \times 10^9$ poises at 380° C., and an average particle diameter of 0.10 microns. The resin formed a contiuous extrudate in the extrusion performance tests.

The experiment of the first paragraph was essentially repeated except that 20 cm. Hg pressure of PEVE (corresponding to 6.4 g.) was fed into the autoclave and the polymerization time was 67 min. and the percent polymer solids formed was 34.6%. The resin had an SSG of 2.153, a specific melt viscosity of $1.9 \times 10^9$ poises at 380° C. and average particle diameter of 0.07 micron.

The experiment of the first paragraph of this Example was essentially repeated except that 40 cm. Hg pressure of PEVE (corresponding 12.1 g.) was fed into the autoclave and the polymerization time was 110 min. and the percent polymer solids formed was 34.6%. The resin had an SSG of 2.157, a specific melt viscosity of $1.5 \times 10^9$ poises at 380° C., and an average particle diameter of 0.14 micron. In the experiments of the preceding paragraph and of this paragraph, the PEVE concentration in the copolymer is estimated to be from 0.10 to 0.28 weight percent and 0.19 to 0.52 weight percent, respectively. All of the resins of this Example formed continuous extrudates in the extrusion performance test but at higher than preferred extrusion pressures.

As many apparently widely different embodiments of this invention may be made without departing from the spirit and scope thereof, it is to be understood that this invention is not limited to the specific embodiments thereof except as defined in the appended claims.

What is claimed is:

1. A tetrafluoroethylene fine powder resin of substantially spheroidal particles of 0.01 to 1.0 micron in diameter having an average particle diameter in the range of 0.07 to 0.35 micron consisting essentially of a copolymer of tetrafluoroethylene with from 0.03 to 1.0 percent based on the weight of the copolymer of perfluoro (alkyl vinyl ether) in which the alkyl group contains 1 to 5 carbon atoms, said resin having a specific melt viscosity of from $1 \times 10^9$ poises of $4.0 \times 10^{10}$ poises at 380° C., a standard specific gravity of no greater than 2.175 and having a flex life of at least $8 \times 10^6$ cycles after aging at 322° C. for 30 days.

2. The resin of claim 1 wherein the specific melt viscosity is from $1 \times 10^9$ to $3.5 \times 10^{10}$ poises.

3. The resin of claim 1 wherein the standard specific gravity is from 2.140 to 2.165.

4. The resin of claim 1 wherein the average particle diameter is from 0.150 to 0.220 micron.

5. The resin of claim 1 wherein the alkyl group is methyl.

6. The resin of claim 1 wherein the alkyl group is propyl.

7. The resin of claim 1 wherein from 0.03 to 0.50 weight percent of perfluoro(alkyl vinyl ether) is present in the copolymer.

8. The resin of claim 1 which is capable of forming a continuous extrudate in the extrusion performance test, requiring an extrusion pressure in the range from 400 to 650 kg./cm.$^2$.

9. The resin of claim 1 capable of forming a continuous extrudate in the extrusion performance test, requiring an extrusion pressure of from 350 to 750 kg./cm.$^2$.

References Cited
UNITED STATES PATENTS 3,142,665    7/1964    Cardinal et al. _____ 260—92.1

STANFORD M. LEVIN, Primary Examiner